United States Patent [19]

Fujiki

[11] Patent Number: 4,698,506

[45] Date of Patent: Oct. 6, 1987

[54] EMISSION COMPUTED TOMOGRAPHY APPARATUS

[75] Inventor: Yutaka Fujiki, Ootawara, Japan

[73] Assignee: Kabushiki Kaisha Toshiba, Kawasaki, Japan

[21] Appl. No.: 823,203

[22] Filed: Jan. 28, 1986

[30] Foreign Application Priority Data

Jan. 29, 1985 [JP] Japan .................................. 60-13415

[51] Int. Cl.$^4$ ............................................... G01T 1/20
[52] U.S. Cl. .................................. 250/363 S; 250/369
[58] Field of Search .................. 250/363 SR, 363 SB, 250/363 SC, 363 SF, 369

[56] References Cited

U.S. PATENT DOCUMENTS 3,979,592 9/1976 Doherty, III et al. ........ 250/363 SF
3,983,399 9/1976 Cox, Jr. et al. ................ 250/363 SF Primary Examiner—Janice A. Howell
Attorney, Agent, or Firm—Finnegan, Henderson, Farabow, Garrett & Dunner

[57] ABSTRACT

An emission computed tomography apparatus comprises a patient couch on which a subject on the dosage of rodioisotope (RI) lies and a two-dimensional position detector for collecting radioisotope distribution data in the subject at various rotation positions while rotating around the subject and the patient couch in order to obtain a tomogram image of the RI distribution in the subject. In order to eliminate a false image (artifact) on the tomogram image resulting form unequal detection characteristics in the position detector, the patient couch is traveled in one direction of the coordinate systems every time the position detector is rotated by a given angle. One position signal from the position detector is corrected in response to the traveling length of the patient couch. An artifact-free tomogram image of the RI distribution is obtained on the basis of the corrected position signal and another position signal from the position detector.

6 Claims, 2 Drawing Figures

EMISSION COMPUTED TOMOGRAPHY APPARATUS

BACKGROUND OF THE INVENTION

The present invention relates to an emission computed tomography (ECT) apparatus adapted to obtain a tomogram image of radioisotope (RI) distribution by detecting RI distributions in one plane of a subject on the dosage of Ri, from various angles, and reconstructing RI distribution data.

In an ECT apparatus, while rotating a detector constituting a scintillation camera stepwise or continuously around a subject to be inspected, RI distribution data in the subject are collected from various directions in one plane. The detector used in the ECT apparatus basically comprises a parallel-hole collimator, scintillation crystal and photomultipliers, and is used as a two-dimensional position detector. A tomogram image of the RI distribution in the subject is obtained by reconstructing projection data (slice data obtained from a portion of a certain width, or slice portion in a two-dimensional position detector) concerning the RI distribution collected from various angles in one plane of the subject in accordance with convolution and back projection methods, like X-ray CT (computed tomography) apparatus. The reconstructed image is visually displayed by a display device. When there is unequal detection characteristics in a slice of the detector, resulting from the machining accuracy in the collimator and the difference of sensitivities of the photomultipliers, it is inevitable to generate a ringshaped false image (it is called "an artifact" in this technical field) on a tomogram image displayed on the display device. The ring shape of the false image is derived from the data reconstruction in accordance with the back projection processing of slice data collected from various angles of the detector with respect to the subject. The radius of the ring-shaped false image corresponds to a distance between the center of the slice portion in the detector and a portion representing the sensitivity difference. When there are a plurality of portions representing the nonuniformity in detection characteristics in a slice portion of the detector concentric false images are generated.

In order to eliminate false images resulting from the unequal detection characteristics in the detector, a low-pass filter may be used for signal processing. However, this lowers the resolution of a tomogram image.

SUMMARY OF THE INVENTION

It is an object of the present invention to provide an emission computed tomography apparatus which is arranged to eliminate an artifact on a tomogram image, based on unequal detection characteristics of a detector.

The emission computed tomography apparatus according to the present invention, comprises a movable patient coach which is arranged to move in the body axial direction of a subject to be inspected in an interlocked relation to the rotation of a two-dimensional position detector for detecting the position of $\gamma$-ray radiated from RI in the subject, and means for correcting position data from the position detector in response to the traveling length of the patient couch.

DETAILED DESCRIPTION OF THE PREFERRED EMBODIMENT

Figure 1:
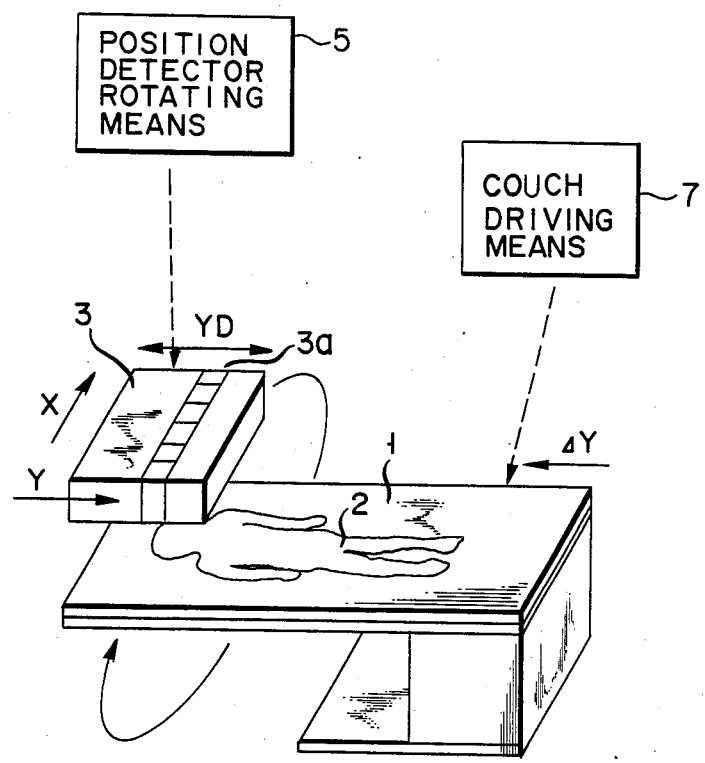
FIG. 1 is a schematic view of an arrangement of emission computed tomography apparatus according to the present invention.

Referring to FIG. 1, an ECT apparatus according to an embodiment of the present invention comprises a patient couch 1 and a detector 3. Detector 3 is supported by supporting means (not shown) so as to rotate around patient couch 1. It is rotated stepwise or continuously around patient couch 1 by detector rotating means 5 to collect RI distribution data of a subject 2 to be inspected, who is laid down on patient couch 1, at various angles in one plane of the subject. Detector 3 is a two-dimensional position detector and the coordinate axes in the X-Y coordinate systems are defined as shown in the Figure. One slice detection portion extending in the X axis direction of detector 3 is designated at 3a. When there is nonuniformity in the detection characteristics of slice detection portion 3a extending in the X direction, a ring-shaped artifact appears on a tomogram image as mentioned above.

Patient couch 1 is arranged to travel in the Y direction in the coordinate systems of detector 3 in an interlocked relation to the rotation of detector 3. To this end, couch driving means 7 is provided. The coach travelling length is set to $\Delta Y$ for the 360-degree rotation of detector 3. The effective visual field length of detector 3 is $Y_D$, and the traveling length $\Delta Y$ of patient couch 1 is smaller than $Y_D$.

Figure 2:
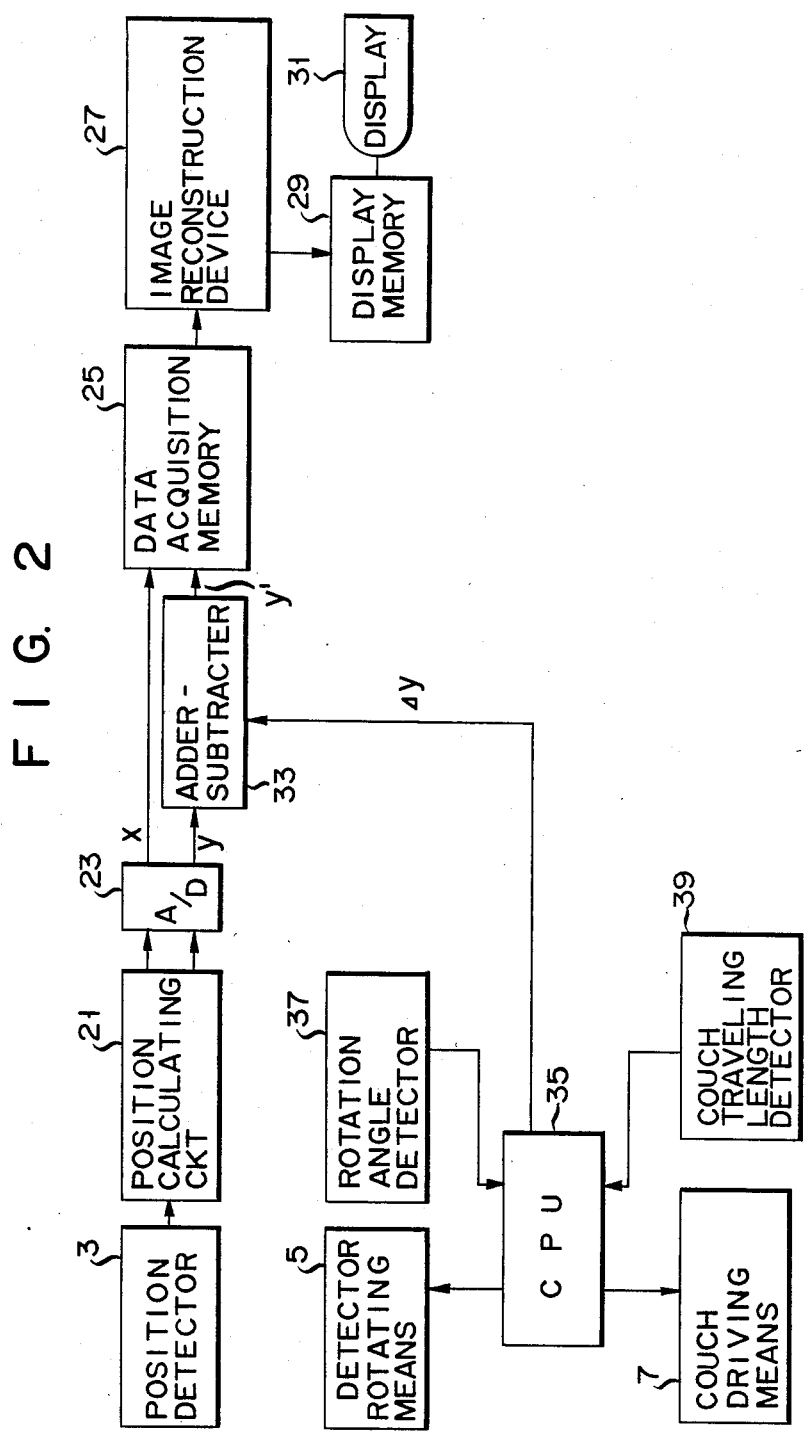
FIG. 2 is a block diagram of signal processing circuit used in the apparatus of the present invention.

The signal processing in the ECT apparatus of the present invention will be described with reference to FIG. 2.

The output of detector 3 is connected to a position calculating circuit 21 which includes a resistance matrix circuit arranged to carry out a weighing operation. Detector 3 detects $\gamma$-rays radiated from RI in subject 2. Position calculating circuit 21 calculates a detection position of the $\gamma$-ray detected by two-dimensional detector 3, and produces X,Y pulse position signals whose peak values are a function of the detection position. Position calculating circuit 21 is connected to an analog-to-digital (A/D) converter 23 to produce X,Y digital position signals. The X, Y position signals are stored in a data acquisition memory 25. An output signal of memory 25 is aplied to an image reconstruction circuit 27 to be subjected to convolution and back projection processings as mentioned before, so that an image information signal which represents a tomogram image of RI distributions in one plane of the subject to be inspected. The image information signal from image reconstruction circuit 27 is applied to a display memory 29 and a display 31 connected to the display memory displays the tomogram image of RI distribution of the subject. The signal processing, as mentioned above, is the same as that of a conventional ECT apparatus.

In accordance with the present invention, an adder-subtracter 33 is provided between A/D converter 23 and data acquisition memory 25, which receives a Y position signal to produce a Y' position signal for correcting the unequal detection characteristics in detector 3. A correction signal $\Delta y$ for correcting the Y position signal is applied to adder-subtracter 33 from a central processor unit (CPU).

Detector rotating means 5 and couch driving means 7 are controlled by CPU 35 so that the rotation of detector 3 and the Y-direction traveling of patient couch 1 are interlocked with each other. A rotation angle detector 37 is provided, which detects the rotation angle of detector 3 and whose output is coupled to CPU 35. A couch traveling length detector 39 is provided, which measures the traveling length in the Y direction of patient couch 1 driven by coach driving means 7 responsive to CPU 35. The output of couch traveling length detector 39 is coupled to CPU 35, so that patient couch 1 is controlled so as to travel by a distance instructed by CPU 35. CPU 35 applies the correction signal $\Delta y$ to adder-subtracter 33.

The present invention is based on the following principle. When there is nonuniformity in the detection characteristics in the X axis direction of detection portion 3a located at $Y_0$ of the Y coordinate axis in two-dimensional position detector 3, as mentioned before, an artifact is generated on a tomogram image collected by the detection portion at location $Y_0$. Even if the nonuniformity in the detection characteristic of the slice detection portion at location $Y_0$ can be seen, there is little possibility that nonuniformity exists in the detection characteristics of other slice detection portions. In the present invention, patient couch 1 travels in the Y direction, whereby the inspection plane of the subject moves relative to detector 3. As a result, the same inspection plane of the subject is detected by a slice detection portion located at a position different from $Y_0$. There is little possibility that the detected result includes a signal which may permit the generation of an artifact. As the patient couch travels, the relative position of detector 3 to patient couch 1 shifts in the Y direction. In order to collect RI distribution data in the same inspection plane of the subject while rotating detector 3, therefore, the Y direction position data should be corrected in accordance with the traveling length of the patient couch. For this reason, it is possible to collect the RI distribution data for the same inspection plane of the subject to be inspected by detection portions of the detector 3 which locate different locations in the Y direction. Thus, the possibility of generating the ring-shaped artifact on the tomogram image can be considerably lowered.

The operation of the ECT apparatus of the present invention will be described hereinafter.

In the ECT apparatus, it is assumed that the data collection of RI distribution is carried out, for example, every 10-degree rotation angle. Namely, 36 photographs (=360 degrees/10 degrees) for data collection is carried out, while detector 3 makes one revolution around the subject 2 to be inspected. In the initial state, the rotation angle of detector 3 is 0 degrees, and patient couch 1 is in the original position. When detector 3 rotates by 10 degrees by an instruction of CPU 35, patient couch 1 travels by $\Delta Y/36$ in the Y direction. When detector 3 rotates by 20 degrees, patient couch 1 travels by $(\Delta Y/36) \times 2$. When detector 3 rotates by 360 degrees, patient couch 1 travels by $(\Delta Y/36) \times 36 = \Delta Y$. In this way every time detector 3 rotates by 10 degrees, data collection of RI distribution in the subject 2 is carried out.

As patient couch 1 travels in the Y direction, the relative position of detector 3 to subject 2 is shifted by $\Delta Y/36$ for each data collection. This means that the inspection plane of subject 2 shifts $\Delta Y/36$ by $\Delta/36$ with respect to detector 3. In other words, the data collections for the same inspection plane of subject 2 are sequentially carried out by slice portions in the detector displaced $\Delta Y/36$ by $\Delta Y/36$ in the Y direction. Therefore, in order to collect X,Y position signals representing the RI distribution data for the same inspection plane of subject 2, it is necessary to correct the Y signal obtained from position calculating circuit 21 in accordance with the shift length $\Delta Y/36$ of the patient couch for each data collection. CPU 35 outputs the correction signal $\Delta y (= \Delta Y/36)$ each time detector 3 rotates by 10 degrees and supplies it to adder-subtractor 33. In adder-subtractor 33, the Y signal from A/D converter 23 is combined (added or subtracted in accordance with the traveling direction of the patient couch) with the correction signal $\Delta y$. As a result, it is possible to obtain a correct position signal Y' for the same inspection plane of subject 2 irrespective of the relative traveling between detector 3 and subject 2 in the Y direction.

In the preferred embodiment which has been described, in order to achieve the relative traveling between the detector and the patient couch, the patient couch is arranged to travel in the Y direction. Alternatively, the detector may be arranged to travel relative to the patient couch in an interlocked relation to the rotation of the detector. However, it is desirable to travel the patient couch, as in the preferred embodiment, because the detector is weightly due to a lead shield plate provided therein.

What is claimed is:

1. An emission computed tomography apparatus for providing a tomogram image of a patient containing a dosage of radioisotope comprising:
    a couch for supporting said patient;
    a two-dimension detector for collecting data concerning the distribution of said radioisotope in said patient, said detector having an effectual visual field of length $Y_D$ along the longitudinal axis of said couch;
    means for rotating said detector about said longitudinal axis of said couch in a series of N incremental angular steps;
    driving means for moving said detector relative to said longitudinal axis of said couch a given distance after each incremental angular step rotation of said detector, wherein the sum of said given distances for said N incremental angular steps is less than $Y_D$, whereby for each incremental angular step any given slice of said patient is interrogated by a different portion of said detector to thereby minimize the generation of artifacts by said detector;
    position signal correction means for correcting said data from said detector as a function of said given distance of relative movement between said detector and said longitudinal axis of said couch; and
    means for constructing a tomogram image of said patient in response to said corrected output data.

2. An emission computed tomography apparatus, according to claim 1, wherein said driving means comprises means for moving said patient coach in one direction of the coordinate systems in said position detector.

3. An emission computed tomography apparatus, according to claim 1, wherein said position signal correction means comprises an adder-subtracter circuit.

4. A method for providing a tomogram image of a patient containing a dose of radioisotope, comprising the steps of:

positioning a patient on a couch;

rotating a two-dimensional detector about the longitudinal axis of said couch in a series of N incremental angular steps;

obtaining data at each of said angular steps concerning the distribution of said radioisotope in said patient;

moving said detector relative said longitudinal axis of said couch a given distance after each incremental angular step rotation of said detector, wherein the sum of said given distances for said N incremental steps is less than the visual field of said detector along the longitudinal axis of said couch, such that for each incremental angular step any given slice of said patient is interrogated by a different portion of said detector to thereby minimize the generation of artifacts by said detector;

correcting said data from said detector as a function of said given distances of relative movement between said detector and said longitudinal axis of said couch; and constructing a tomogram image of said patient in response to said corrected output data.

5. The method of claim 4 wherein said step of obtaining includes relating said data to a coordinate system related to said detector.

6. The method of claim 5 wherein said step of correcting includes obtaining a correction signal indicative of each of said given distances of relative movement between said detector and said longitudinal axis of said couch and combining said correction signal with the position portion of said data from said detector for a direction in said coordinate system normal to said longitudinal axis of said couch.

* * * * *